No. 762,911. PATENTED JUNE 21, 1904.
M. M. KIME.
EYEGLASSES.
APPLICATION FILED OCT. 12, 1903.
NO MODEL.
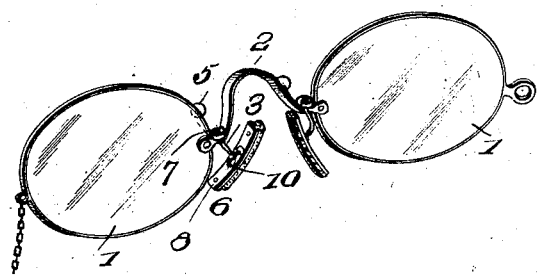
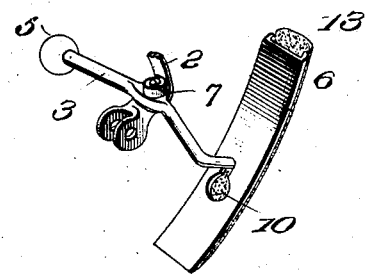
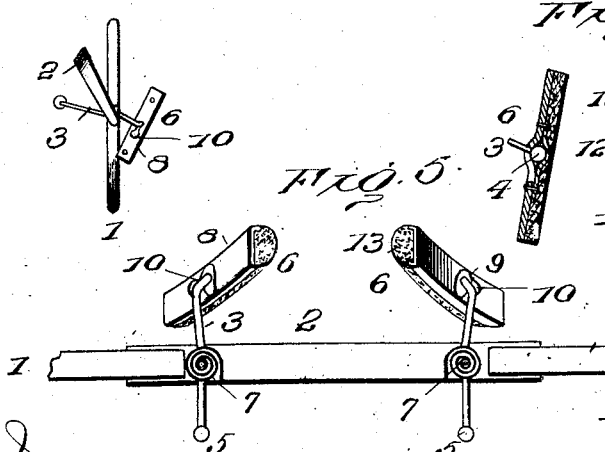
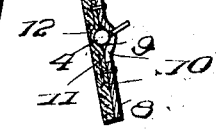
Inventor
M. M. Kime No. 762,911. Patented June 21, 1904.

UNITED STATES PATENT OFFICE.

MARSHALL M. KIME, OF PETERSBURG, INDIANA.

EYEGLASSES.

SPECIFICATION forming part of Letters Patent No. 762,911, dated June 21, 1904.

Application filed October 12, 1903. Serial No. 176,701. (No model.)

*To all whom it may concern:*

Be it known that I, MARSHALL M. KIME, a citizen of the United States, residing at Petersburg, in the county of Pike and State of Indiana, have invented certain new and useful Improvements in Eyeglasses, of which the following is a specification.

This invention has relation to eyeglasses, and more particularly to the means for securing the same to the bridge of the nose when worn.

The invention appertains to the type of eyeglasses in which the lenses are connected by means of a rigid bridge in contradistinction to the spring-bridge, the nose-pieces being mounted so as to readily conform to the shape of the nose and equalize the pressure thereon, said nose-pieces being carried by levers pivotally connected to the frame of the eyeglasses and acted upon by springs so as to grip the nose with sufficient force to hold the glasses in place under ordinary conditions.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a pair of eyeglasses embodying the invention. Fig. 2 is an end view of one of the lenses, showing the bridge in central section. Fig. 3 is a detail perspective view of the nose-piece, the lever carrying the nose-piece, and the part to which said lever is pivoted, the parts being on a larger scale. Fig. 4 is a central longitudinal section of the nose-pieces, showing the end portions of the supporting-levers in full. Fig. 5 is a top view of the glasses, showing the parts on a larger scale, the outer portions of the lenses being broken away.

Corresponding and like parts are referred to in the following description and indicated in all the views of the drawings by the same reference characters.

The eyeglasses may be of any structural type or pattern so long as the lenses 1 are connected by means of a bridge 2 of rigid material, the bridge being attached to the lenses in the usual manner either by means of rims or clips. Levers 3 are pivotally connected intermediate of their ends to the eyeglasses near the extremities of the bridge 2 and are provided at their inner ends with balls 4 and are fashioned at their outer ends to provide finger-pieces 5 for convenience of operation. The inner ends of the levers are curved inward toward each other to properly position the ball 4 with reference to the nose-pieces 6. The outer ends of the levers 3 project forward from the plane of the lenses 1 and bridge 2 a distance to admit of the finger-pieces 5 being conveniently grasped when placing the glasses in position or removing them from the nose. Springs 7 coöperate with the levers 3 to press their inner ends toward each other, whereby the nose-pieces 6 are caused to grip the bridge of the nose to hold the glasses in place. The springs 7 may be of any construction and arrangement so long as they effect the desired result. As shown, the springs are of spiral form, one end being engaged with the frame or part of the structure to which the levers 3 are pivoted and the opposite end engaging with said levers in such a manner as to exert a pressure thereon to force the inner ends of said levers toward each other.

The nose-pieces comprise a plate 8, provided at a central point with a hemispherical depression 9, with which communicates the narrow portion of a keyhole-opening 10, a companion plate 11 riveted or otherwise secured at its ends to the plate 8 and having a companion hemispherical depression 12, which, with the depression 9, forms a socket for reception of the ball 4 and a grip 13, the latter being of cork, rubber, or other comparatively soft material to prevent injurious and annoying pressure upon the nose when the glasses are worn. The material comprising the grip 13 may be secured to the plate 8 in any manner common in articles of this nature, and, as shown, the longitudinal edge portions of the plate 8 are bent and incline toward each other to enter depressions in the edges of the part 13, as indicated most clearly in Fig. 3. The keyhole-opening 10 admits of the ball 4 being readily passed into the depression 9 preliminary to securing the plate 11 to the plate 8. The ball-and-socket joint between the levers 3 and the nose-pieces 6 admits of the latter readily conforming to the shape of the nose as well as providing for varying the inclination of the lenses without changing the grip of the nose-pieces upon the bridge of the nose.

To place the glasses in position or remove them from the nose, the finger-pieces 5 are grasped between the thumb and finger of the hand and are pressed together, thereby moving the nose-pieces apart a distance to admit of the bridge of the nose passing readily therebetween. Upon releasing the levers 3, the springs 7 regaining themselves move the levers 3 inward at their inner ends and cause the nose-pieces to grip opposite sides of the nose, thereby holding the eyeglasses in place. The nose-pieces are self-adjusting by reason of the universal and ball-and-socket connection with the levers 3, and the lenses may be inclined more or less to suit the convenience of the user.

Having thus described the invention, what is claimed as new is—

1. In eyeglasses, the combination of levers pivoted between their ends to the frame and having their outer ends extended to form finger-pieces, said levers being provided at their inner ends with balls, nose-pieces composed of companion plates, each having an approximately hemispherical depression, which unitedly form a socket for reception of the ball at the inner end of one of the levers, and a grip fitted to the plates for direct contact with the nose, and springs coöperating with said levers to cause the nose-pieces to grip the bridge of the nose when the glasses are worn, substantially as set forth.

2. In eyeglasses, the combination of levers pivoted between their ends to the frame and having outer ends extended to form finger-pieces, said levers being provided at their inner ends with balls, a plate fitted to the inner end of each lever and having a hemispherical depression and a keyhole-opening, the latter having its narrow portion extended into said depression, a companion plate secured to the first-mentioned plate and provided with a hemispherical depression to form with the depression of the first-mentioned plate a socket for reception of the ball at the inner end of the lever, and springs coöperating with said levers to cause the nose-pieces to grip the bridge of the nose when the glasses are worn, substantially as set forth.

In testimony whereof I affix my signature in presence of two witnesses.

MARSHALL M. KIME. [L. S.]

Witnesses:
 ISAAC WHITAKER,
 HEBER BASINGER.